United States Patent
Xu et al.

(10) Patent No.: US 9,638,975 B2
(45) Date of Patent: May 2, 2017

(54) METHOD FOR MANUFACTURING COA LIQUID CRYSTAL PANEL COMPRISING COLOR RESIST BLOCKS HAVING FIRST AND SECOND INTERSECTION ZONES AND COA LIQUID CRYSTAL PANEL

(71) Applicant: Shenzhen China Star Optoelectronics Technology Co., Ltd., Shenzhen (CN)

(72) Inventors: Hongyuan Xu, Shenzhen (CN); Bo Sun, Shenzhen (CN)

(73) Assignee: SHENZHEN CHINA STAR OPTOELECTRICS TECHNOLOGY CO., LTD., Shenzhen, Guangdong (CN)

( * ) Notice: Subject to any disclaimer, the term of this patent is extended or adjusted under 35 U.S.C. 154(b) by 202 days.

(21) Appl. No.: 14/758,564

(22) PCT Filed: Apr. 22, 2015

(86) PCT No.: PCT/CN2015/077155
§ 371 (c)(1),
(2) Date: Jun. 30, 2015

(87) PCT Pub. No.: WO2016/145708
PCT Pub. Date: Sep. 22, 2016

(65) Prior Publication Data
US 2017/0045767 A1    Feb. 16, 2017

(30) Foreign Application Priority Data

Mar. 18, 2015    (CN) .......................... 2015 1 0119334

(51) Int. Cl.
*G02F 1/1368*    (2006.01)
*G02F 1/1333*    (2006.01)
(Continued)

(52) U.S. Cl.
CPC .......... *G02F 1/1368* (2013.01); *G02F 1/1333* (2013.01); *G02F 1/1335* (2013.01);
(Continued)

(58) Field of Classification Search
CPC ........ G02F 2001/133302; G02F 2001/136295; G02F 2001/133357; G02F 2202/02
See application file for complete search history.

(56) References Cited

U.S. PATENT DOCUMENTS

2010/0001936 A1*    1/2010    Kim ...................... G02F 1/1368
                                                                    345/87
2010/0118236 A1*    5/2010    Kim .................. G02F 1/133512
                                                                    349/106
(Continued)

FOREIGN PATENT DOCUMENTS

CN    101650502 A    2/2010
CN    104090434 A    10/2014
(Continued)

*Primary Examiner* — Paul Lee
(74) *Attorney, Agent, or Firm* — Leong C. Lei

(57) ABSTRACT

The present invention provides a method for manufacturing a COA liquid crystal panel and a COA liquid crystal panel. The method includes forming a first pixel electrode layer on a color resist layer, forming a planarization layer on the first pixel electrode layer, and forming a second pixel electrode layer that is in engagement with the first pixel electrode layer on the planarization layer so as to achieve planarization of the pixel electrode layer to the maximum extent. Further, the second pixel electrode layer includes a pixel electrode block that is located in each sub pixel zone and has a lateral border located above a scan line and a longitudinal border located above a signal line so as to achieve self-shielding of light for the scan line and the signal line, allowing for omission of lateral and longitudinal black matrixes. Further, a dot-like black matrix is formed on a glass substrate at a location corresponding to a TFT on the array substrate to shield light for a site of a channel thereby simplifying the manufacturing process and increase the aperture ratio.

13 Claims, 5 Drawing Sheets

(51) Int. Cl.
*G02F 1/1335* (2006.01)
*G02F 1/1343* (2006.01)
*G02F 1/1362* (2006.01)

(52) U.S. Cl.
CPC ........ *G02F 1/1343* (2013.01); *G02F 1/13439* (2013.01); *G02F 1/136227* (2013.01); *G02F 1/136286* (2013.01); *G02F 2001/133302* (2013.01); *G02F 2001/133357* (2013.01); *G02F 2001/136222* (2013.01); *G02F 2001/136295* (2013.01); *G02F 2201/121* (2013.01); *G02F 2201/123* (2013.01); *G02F 2201/52* (2013.01); *G02F 2202/02* (2013.01)

(56) References Cited

U.S. PATENT DOCUMENTS

| | | | | |
|---|---|---|---|---|
| 2012/0248444 | A1* | 10/2012 | Kang | H01L 27/1292 |
| | | | | 257/59 |
| 2013/0100385 | A1* | 4/2013 | Hou | G02F 1/133512 |
| | | | | 349/106 |

FOREIGN PATENT DOCUMENTS

| | | |
|---|---|---|
| CN | 104375313 A | 2/2015 |
| JP | P201072512 A | 4/2010 |

* cited by examiner

METHOD FOR MANUFACTURING COA LIQUID CRYSTAL PANEL COMPRISING COLOR RESIST BLOCKS HAVING FIRST AND SECOND INTERSECTION ZONES AND COA LIQUID CRYSTAL PANEL

BACKGROUND OF THE INVENTION

1. Field of the Invention

The present invention relates to the field of display technology, and in particular to a method for manufacturing a color filter on array (COA) liquid crystal panel and a COA liquid crystal panel.

2. The Related Arts

Liquid crystal displays (LCDs) have a variety of advantages, such as thin device body, low power consumption, and being free of radiation, and are thus of wide applications, such as liquid crystal televisions, mobile phones, personal digital assistants (PDAs), digital cameras, computer monitors, and notebook computer screens.

A liquid crystal display generally comprises an enclosure, a liquid crystal panel arranged in the enclosure, and a backlight module mounted in the enclosure. The liquid crystal panel has a structure that is composed of a thin-film transistor (TFT) array substrate, a color filter (CF) substrate, and a layer of liquid crystal arranged between the two substrates and the operation principle thereof is that a drive voltage is applied to the two glass substrates to control the rotation of liquid crystal molecules of the liquid crystal layer in order to refract light from the backlight module out to generate an image.

Color filter on array (COA) is a technique that allows a color resist layer of the CF substrate to be formed on the array substrate. The COA structure helps reduce coupling between a pixel electrode and metal wiring so that signal delay on the metal wiring may be improved. The COA structure may significantly reduce the parasitic capacitance and increase the aperture ratio and thus improve the displaying quality of the panel.

However, in a conventional COA liquid crystal panel, the color resist layer is composed of red, green, and blue color resist blocks corresponding to red, green, and blue sub pixel zones. Adjacent ones of the color resist blocks must overlap each other to some extents during the manufacturing thereof, so as to form an intersection zone. Liquid crystal that is located above the intersection zone may suffer incorrect orientation due to terrain variation and thus needs a black matrix of a large area to be formed on one side of the glass substrate for shielding. However, the arrangement of the black matrix of a large area causes a loss of a large fraction of aperture ratio.

SUMMARY OF THE INVENTION

An object of the present invention is to provide a method for manufacturing a color filter on array (COA) liquid crystal panel, which simplifies the manufacturing process and increases aperture ratio.

Another object of the present invention is to provide a COA liquid crystal panel, which has a simple structure, a high aperture ratio, and reduced power consumption.

To achieve the above object, the present invention first provides a method for manufacturing a COA liquid crystal panel, which comprises the following steps:

(1) providing an array substrate and a glass substrate, wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, and a passivation layer arranged on the source/drain terminals and covering the gate insulation layer;

(2) forming a color resist layer on the passivation layer, wherein the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line;

(3) forming a first via in the color resist layer to correspond to and be located above the source/drain terminals and forming a first pixel electrode layer on the color resist layer, wherein the first pixel electrode layer is set in engagement with the source/drain terminals through the first via;

(4) forming a planarization layer on the first pixel electrode layer and forming a second via in the planarization layer;

(5) depositing and patterning a second pixel electrode layer on the planarization layer, wherein the second pixel electrode layer is set in engagement with the first pixel electrode layer through the second via, the second pixel electrode layer comprising a pixel electrode block located in each of the sub pixel zones, the pixel electrode block having a lateral border located above the scan line and a longitudinal border located above the signal line;

(6) forming a dot-like black matrix on the glass substrate at a location corresponding to the semiconductor layer and forming a common electrode layer on the black matrix; and (7) laminating the array substrate and the glass substrate with each other and filling therein a liquid crystal layer.

Step (2) uses a coating process to form the color resist layer.

Step (4) uses an exposure process to form the second via and the planarization layer is formed of a transparent organic material.

Step (5) uses physical vapor deposition to form the second pixel electrode layer.

The first pixel electrode layer, the second pixel electrode layer, and the common electrode layer are made of a material of indium tin oxide.

The present invention also provides a COA liquid crystal panel, which comprises an array substrate, a glass substrate arranged opposite to the array substrate, and a liquid crystal layer arranged between the array substrate and the glass substrate;

wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, a passivation layer arranged on the source/drain terminals and covering the gate insulation layer, a color resist layer arranged on the passivation layer, a first pixel electrode layer arranged on the color resist layer, a planarization layer arranged on the first pixel electrode layer, and a second pixel electrode layer arranged on the planarization layer;

the color resist layer and the passivation layer comprise a first via formed therein to correspond to and be located above the source/drain terminals, the planarization layer comprising a second via formed therein, the first pixel electrode layer being in engagement with the source/drain terminals through the first via, the second pixel electrode layer being in engagement with the first pixel electrode layer through the second via; and the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line, the second pixel electrode layer comprising a pixel electrode block located in each of the sub pixel zones, the pixel electrode block having a lateral border located above the scan line and a longitudinal border located above the signal line.

The planarization layer is formed of a transparent organic material.

The glass substrate comprises a dot-like black matrix formed thereon at a location corresponding to the semiconductor layer and a common electrode layer is formed on the black matrix.

The first pixel electrode layer, the second pixel electrode layer, and the common electrode layer are formed of a material of indium tin oxide.

The source/drain terminals, the gate terminal, the scan line, and the signal line are made of metallic materials of iron, molybdenum, or copper.

The present invention further provides a COA liquid crystal panel, which comprises an array substrate, a glass substrate arranged opposite to the array substrate, and a liquid crystal layer arranged between the array substrate and the glass substrate;

wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, a passivation layer arranged on the source/drain terminals and covering the gate insulation layer, a color resist layer arranged on the passivation layer, a first pixel electrode layer arranged on the color resist layer, a planarization layer arranged on the first pixel electrode layer, and a second pixel electrode layer arranged on the planarization layer;

the color resist layer and the passivation layer comprise a first via formed therein to correspond to and be located above the source/drain terminals, the planarization layer comprising a second via formed therein, the first pixel electrode layer being in engagement with the source/drain terminals through the first via, the second pixel electrode layer being in engagement with the first pixel electrode layer through the second via; and the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line, the second pixel electrode layer comprising a pixel electrode block located in each of the sub pixel zones, the pixel electrode block having a lateral border located above the scan line and a longitudinal border located above the signal line;

wherein the planarization layer is formed of a transparent organic material; and wherein the source/drain terminals, the gate terminal, the scan line, and the signal line are made of metallic materials of iron, molybdenum, or copper.

The efficacy of the present invention is that the present invention provides a method for manufacturing a COA liquid crystal panel and a COA liquid crystal panel, in which through forming a first pixel electrode layer on a color resist layer, forming a planarization layer on the first pixel electrode layer, and forming a second pixel electrode layer on the planarization layer and in engagement with the first pixel electrode layer, the pixel electrode layer is planarized to the maximum extents. Further, the second pixel electrode layer comprises a pixel electrode block that is located in each sub pixel zone and has a lateral border located above a scan line and a longitudinal border located above a signal line so as to achieve self-shielding of light for the scan line and the signal line, allowing for omission of lateral and longitudinal black matrixes. Further, a dot-like black matrix is formed on a glass substrate at a location corresponding to a TFT on the array substrate to shield light for a site of a channel thereby simplifying the manufacturing process and increase the aperture ratio.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
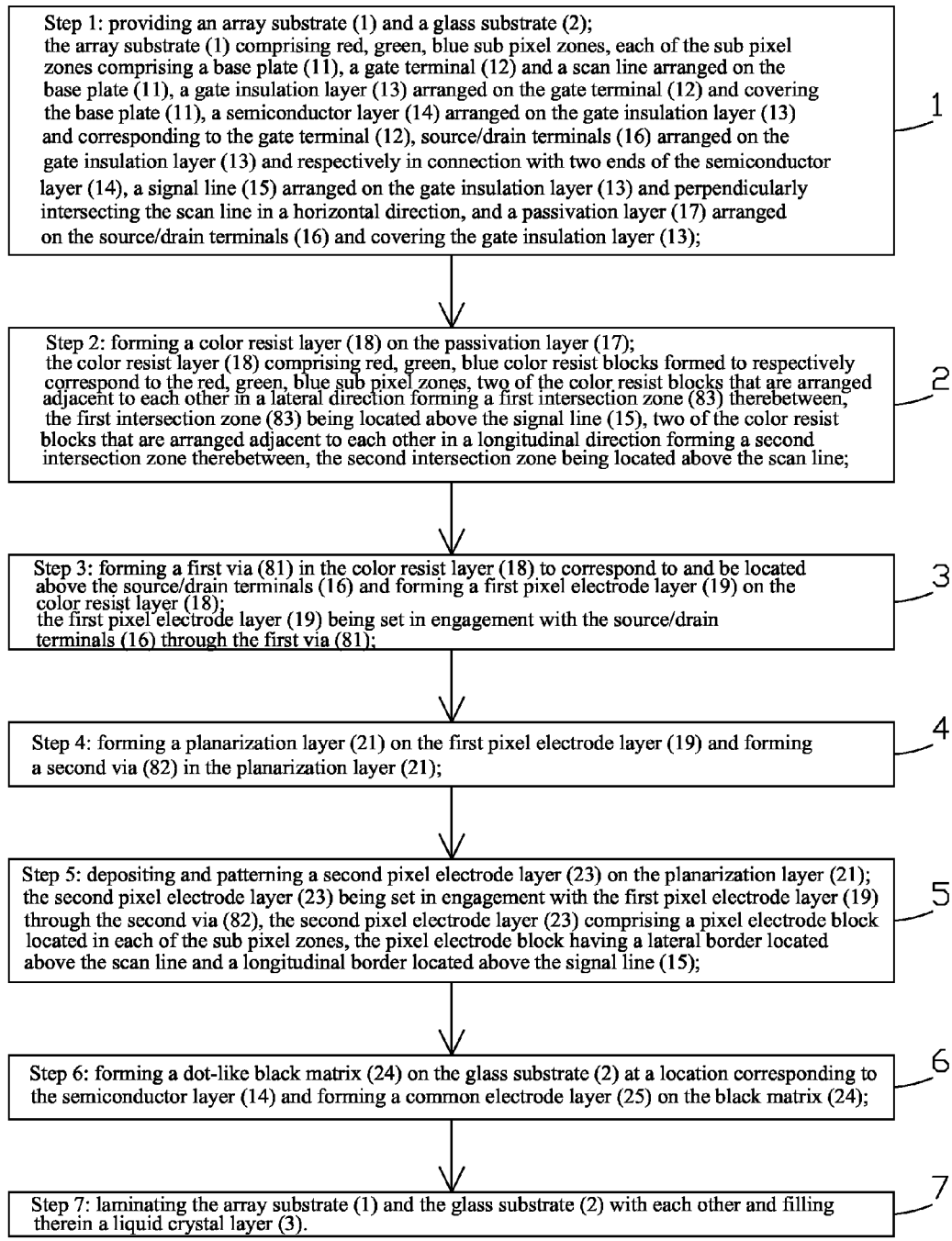
FIG. 1 is a flow chart illustrating a method for manufacturing a color filter on array (COA) liquid crystal panel according to the present invention.
Figure 2:
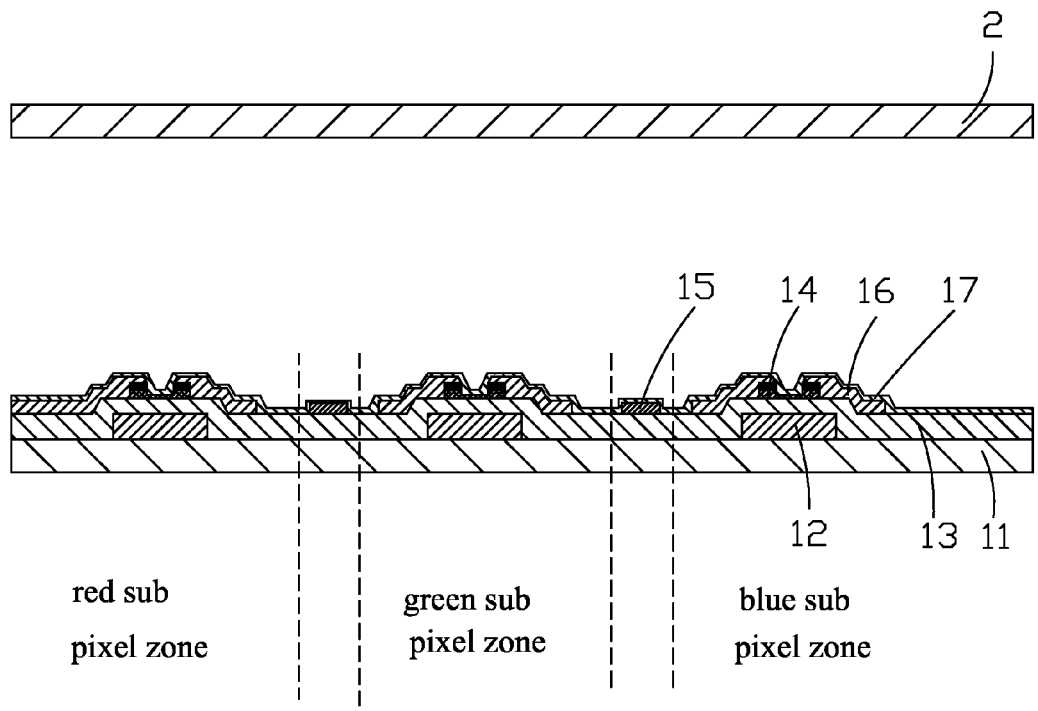
FIG. 2 is a schematic view illustrating step 1 of the method for manufacturing the COA liquid crystal panel according to the present invention.

Referring to FIG. 1, the present invention provides a method for manufacturing a color filter on array (COA) liquid crystal panel, which comprises the following steps:

Step 1: as shown in FIG. 2, providing an array substrate 1 and a glass substrate 2.

Specifically, the array substrate 1 comprises red, green, blue sub pixel zones. Each of the sub pixel zones comprises a base plate 11, a gate terminal 12 and a scan line arranged on the base plate 11, a gate insulation layer 13 arranged on the gate terminal 12 and covering the base plate 11, a semiconductor layer 14 arranged on the gate insulation layer 13 and located above the gate terminal 12, source/drain terminals 16 arranged on the gate insulation layer 13 and respectively in connection with two ends of the semiconductor layer 14, a signal line 15 arranged on the gate insulation layer 13 and perpendicularly intersecting the scan line in a horizontal direction, and a passivation layer 17 arranged on the source/drain terminals 16 and covering the gate insulation layer 13.

Specifically, the source/drain terminals 16, the gate terminal 12, the signal line 15, and the scan line are made of metallic materials of iron, molybdenum, or copper.

Figure 3:
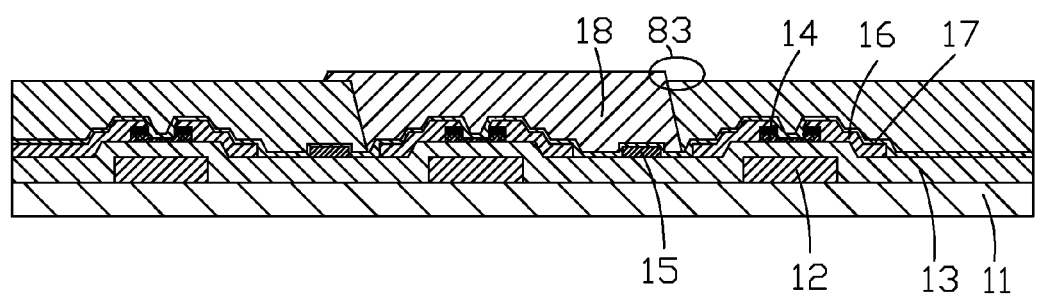
FIG. 3 is a schematic view illustrating step 2 of the method for manufacturing the COA liquid crystal panel according to the present invention.

Step 2: as shown in FIG. 3, forming a color resist layer 18 on the passivation layer 17.

Specifically, a coating process is used to form the color resist layer 18. The color resist layer 18 comprises red, green, blue color resist blocks formed to respectively correspond to the red, green, blue sub pixel zones. Two of the color resist blocks that are arranged adjacent to each other in a lateral direction form a first intersection zone 83 therebetween and the first intersection zone 83 is located above the signal line 15; and two of the color resist blocks that are arranged adjacent to each other in a longitudinal direction form a second intersection zone therebetween and the second intersection zone is located above the scan line, whereby the scan line and the signal line achieve self-shielding of light and thus lateral and longitudinal black matrixes may be omitted.

Figure 4:
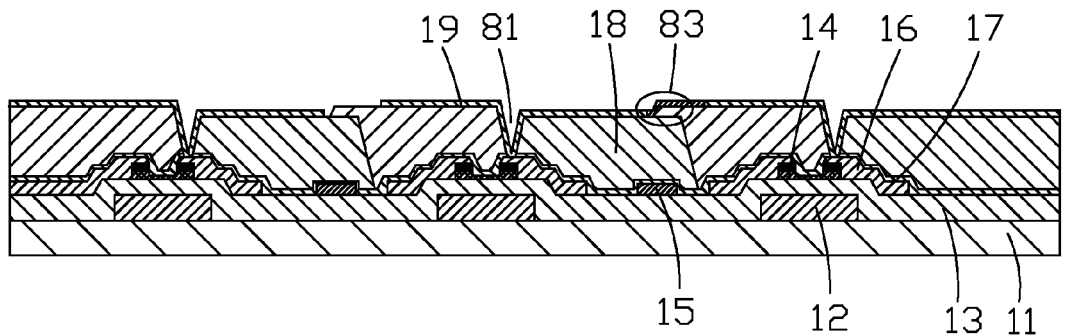
FIG. 4 is a schematic view illustrating step 3 of the method for manufacturing the COA liquid crystal panel according to the present invention.

Step 3: as shown in FIG. 4, forming a first via 81 in the color resist layer 18 to correspond to and be located above the source/drain terminals 16 and forming a first pixel electrode layer 19 on the color resist layer 18.

The first pixel electrode layer 19 is set in engagement with the source/drain terminals 16 through the first via 81.

Figure 5:
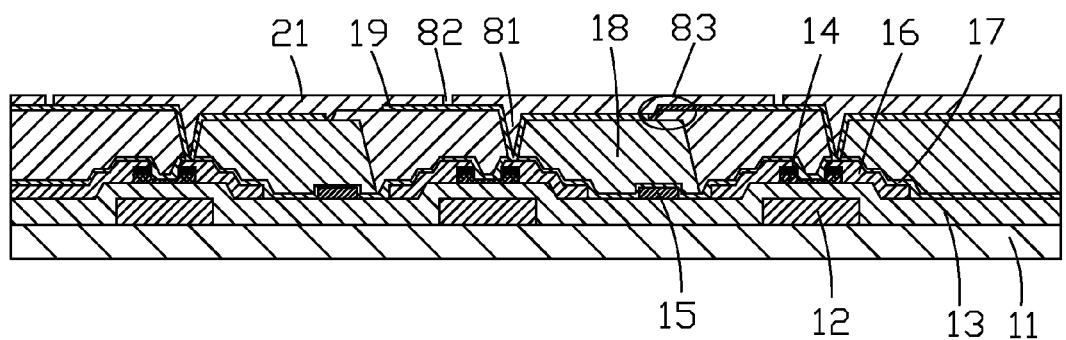
FIG. 5 is a schematic view illustrating step 4 of the method for manufacturing the COA liquid crystal panel according to the present invention.

Step 4: as shown in FIG. 5, forming a planarization layer 21 on the first pixel electrode layer 19 and forming a second via 82 in the planarization layer 21.

Specifically, an exposure process is used to form the second via 82 and the planarization layer 21 is formed of a transparent organic material.

Figure 6:
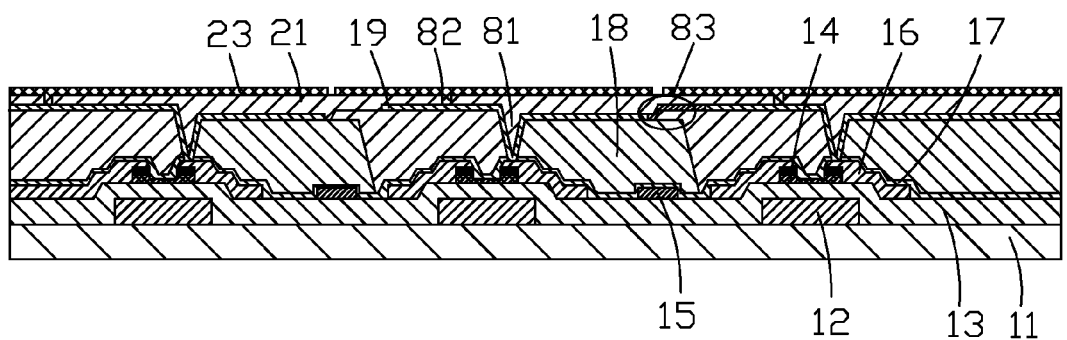
FIG. 6 is a schematic view illustrating step 5 of the method for manufacturing the COA liquid crystal panel according to the present invention.

Step 5: as shown in FIG. 6, depositing and patterning a second pixel electrode layer 23 on the planarization layer 21.

The second pixel electrode layer 23 is set in engagement with the first pixel electrode layer 19 through the second via 82. The second pixel electrode layer 23 comprises a pixel electrode block located in each of the sub pixel zones. The pixel electrode block has a lateral border located above the scan line and a longitudinal border located above the signal line 15.

Specifically, physical vapor deposition (PVD) is used to form the second pixel electrode layer 23.

Figure 7:
FIG. 7 is a schematic view illustrating step 6 of the method for manufacturing the COA liquid crystal panel according to the present invention.
Figure 7:
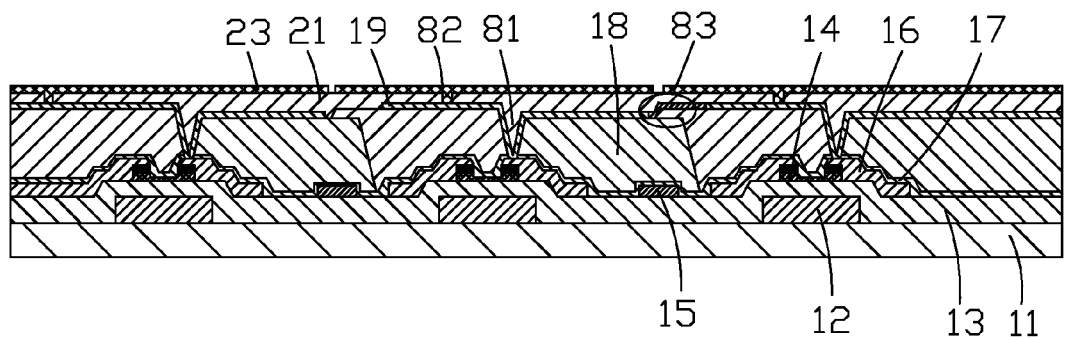

Step 6: as shown in FIG. 7, forming a dot-like black matrix 24 on the glass substrate 2 at a location corresponding to the semiconductor layer 14 and forming a common electrode layer 25 on the black matrix 24.

Specifically, the first pixel electrode layer 19, the second pixel electrode layer 23, and the common electrode layer 25 are formed of a material of indium tin oxide (ITO).

Figure 8:
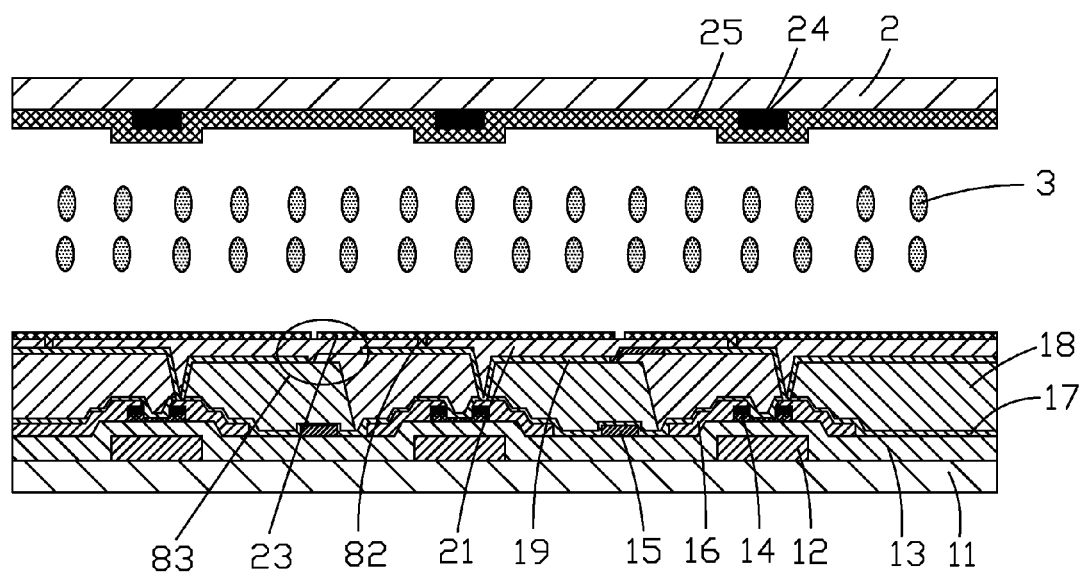
FIG. 8 is a schematic view illustrating step 7 of the method for manufacturing the COA liquid crystal panel according to the present invention and is also a cross-sectional view of the COA liquid crystal panel according to the present invention.

Step 7: as shown in FIG. 8, laminating the array substrate 1 and the glass substrate 2 with each other and filling therein a liquid crystal layer 3.

Specifically, after the lamination, the dot-like black matrix 24 may shield light for a site of a TFT channel of the array substrate 1.

The above-described method for manufacturing a COA liquid crystal panel comprises forming a first pixel electrode layer on a color resist layer, forming a planarization layer on the first pixel electrode layer, and forming a second pixel electrode layer that is in engagement with the first pixel electrode layer on the planarization layer so as to achieve planarization of the pixel electrode layer to the maximum extent. Further, the second pixel electrode layer comprises a pixel electrode block that is located in each sub pixel zone and has a lateral border located above a scan line and a longitudinal border located above a signal line so as to achieve self-shielding of light for the scan line and the signal line, allowing for omission of lateral and longitudinal black matrixes. Further, a dot-like black matrix is formed on a glass substrate at a location corresponding to a TFT on the array substrate to shield light for a site of a channel thereby simplifying the manufacturing process and increase the aperture ratio.

Referring to FIG. 8, the present invention also provides a COA liquid crystal panel, which comprises an array substrate 1, a glass substrate 2 arranged opposite to the array substrate 1, and a liquid crystal layer 3 arranged between the array substrate 1 and the glass substrate 2.

Specifically, the array substrate 1 comprises red, green, blue sub pixel zones. Each of the sub pixel zones comprises a base plate 11, a gate terminal 12 and a scan line arranged on the base plate 11, a gate insulation layer 13 arranged on the gate terminal 12 and covering the base plate 11, a semiconductor layer 14 arranged on the gate insulation layer 13 and located above the gate terminal 12, source/drain terminals 16 arranged on the gate insulation layer 13 and respectively contacting two ends of the semiconductor layer 14, a signal line 15 arranged on the gate insulation layer 13 and perpendicularly intersecting the scan line in a horizontal direction, a passivation layer 17 arranged on the source/drain terminals 16 and covering the gate insulation layer 13, a color resist layer 18 arranged on the passivation layer 17, a first pixel electrode layer 19 arranged on the color resist layer 18, a planarization layer 21 arranged on the first pixel electrode layer 19, and a second pixel electrode layer 23 arranged on the planarization layer 21.

Specifically, the source/drain terminals 16, the gate terminal 12, the signal line 15, and the scan line are made of metallic materials of iron, molybdenum, or copper.

The color resist layer 18 and the passivation layer 17 comprise a first via 81 formed therein to correspond to and be located above the source/drain terminals 16. The planarization layer 21 comprises a second via 82 formed therein and the first pixel electrode layer 19 is in engagement with the source/drain terminals 16 through the first via 81. The second pixel electrode layer 23 is in engagement with the first pixel electrode layer 19 through the second via 82.

The color resist layer 18 comprises red, green, blue color resist blocks formed to respectively correspond to the red, green, blue sub pixel zones. Two of the color resist blocks that are arranged adjacent to each other in a lateral direction form a first intersection zone 83 therebetween and the first intersection zone 83 is located above the signal line 15; and two of the color resist blocks that are arranged adjacent to each other in a longitudinal direction form a second intersection zone therebetween and the second intersection zone is located above the scan line. The second pixel electrode layer 23 comprises a pixel electrode block located in each of the sub pixel zones. The pixel electrode block has a lateral border located above the scan line and a longitudinal border located above the signal line 15.

Specifically, the planarization layer 21 is formed of a transparent organic material.

The glass substrate 2 comprises a dot-like black matrix 24 formed thereon at a location corresponding to the semiconductor layer 14 and a common electrode layer 25 is formed on the black matrix 24. The dot-like black matrix 24 help shields light for a site of a TFT channel of the array substrate 1.

Specifically, the first pixel electrode layer 19, the second pixel electrode layer 23, and the common electrode layer 25 are formed of a material of indium tin oxide.

The above-described COA liquid crystal panel comprises a first pixel electrode layer formed on a color resist layer, a planarization layer formed on the first pixel electrode layer, and a second pixel electrode layer formed on the planarization layer and in engagement with the first pixel electrode layer so as to achieve planarization of the pixel electrode layer to the maximum extent. Further, the second pixel electrode layer comprises a pixel electrode block that is located in each sub pixel zone and has a lateral border located above a scan line and a longitudinal border located above a signal line so as to achieve self-shielding of light for the scan line and the signal line, allowing for omission of lateral and longitudinal black matrixes. Further, a dot-like black matrix is formed on a glass substrate at a location corresponding to a TFT on the array substrate to shield light for a site of a channel thereby having a simple structure, a high aperture ratio, and reduced power consumption.

In summary, the present invention provides a method for manufacturing a COA liquid crystal panel and a COA liquid crystal panel, in which through forming a first pixel electrode layer on a color resist layer, forming a planarization layer on the first pixel electrode layer, and forming a second pixel electrode layer on the planarization layer and in engagement with the first pixel electrode layer, the pixel electrode layer is planarized to the maximum extents. Further, the second pixel electrode layer comprises a pixel electrode block that is located in each sub pixel zone and has a lateral border located above a scan line and a longitudinal border located above a signal line so as to achieve self-shielding of light for the scan line and the signal line, allowing for omission of lateral and longitudinal black matrixes. Further, a dot-like black matrix is formed on a glass substrate at a location corresponding to a TFT on the array substrate to shield light for a site of a channel thereby simplifying the manufacturing process and increase the aperture ratio.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for manufacturing a color filter on array (COA) liquid crystal panel, comprising the following steps:
   (1) providing an array substrate and a glass substrate,
   wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, and a passivation layer arranged on the source/drain terminals and covering the gate insulation layer;
   (2) forming a color resist layer on the passivation layer, wherein the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line;
   (3) forming a first via in the color resist layer to correspond to and be located above the source/drain terminals and forming a first pixel electrode layer on the color resist layer,
   wherein the first pixel electrode layer is set in engagement with the source/drain terminals through the first via;
   (4) forming a planarization layer on the first pixel electrode layer and forming a second via in the planarization layer;
   (5) depositing and patterning a second pixel electrode layer on the planarization layer,
   wherein the second pixel electrode layer is set in engagement with the first pixel electrode layer through the second via, the second pixel electrode layer comprising a pixel electrode block located in each of the sub pixel zones, the pixel electrode block having a lateral border located above the scan line and a longitudinal border located above the signal line;
(6) forming a dot-like black matrix on the glass substrate at a location corresponding to the semiconductor layer and forming a common electrode layer on the black matrix; and
(7) laminating the array substrate and the glass substrate with each other and filling therein a liquid crystal layer.

2. The method for manufacturing the COA liquid crystal panel as claimed in claim 1, wherein step (2) uses a coating process to form the color resist layer.

3. The method for manufacturing the COA liquid crystal panel as claimed in claim 1, wherein step (4) uses an exposure process to form the second via and the planarization layer is formed of a transparent organic material.

4. The method for manufacturing the COA liquid crystal panel as claimed in claim 1, wherein step (5) uses physical vapor deposition to form the second pixel electrode layer.

5. The method for manufacturing the COA liquid crystal panel as claimed in claim 1, wherein the first pixel electrode layer, the second pixel electrode layer, and the common electrode layer are made of a material of indium tin oxide.

6. A color filter on array (COA) liquid crystal panel, comprising an array substrate, a glass substrate arranged opposite to the array substrate, and a liquid crystal layer arranged between the array substrate and the glass substrate;
wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, a passivation layer arranged on the source/drain terminals and covering the gate insulation layer, a color resist layer arranged on the passivation layer, a first pixel electrode layer arranged on the color resist layer, a planarization layer arranged on the first pixel electrode layer, and a second pixel electrode layer arranged on the planarization layer;
the color resist layer and the passivation layer comprise a first via formed therein to correspond to and be located above the source/drain terminals, the planarization layer comprising a second via formed therein, the first pixel electrode layer being in engagement with the source/drain terminals through the first via, the second pixel electrode layer being in engagement with the first pixel electrode layer through the second via; and
the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line, the second pixel electrode layer comprising a pixel electrode block located in each of the sub pixel zones, the pixel electrode block having a lateral border located above the scan line and a longitudinal border located above the signal line.

7. The COA liquid crystal panel as claimed in claim 6, wherein the planarization layer is formed of a transparent organic material.

8. The COA liquid crystal panel as claimed in claim 6, wherein the glass substrate comprises a dot-like black matrix formed thereon at a location corresponding to the semiconductor layer and a common electrode layer is formed on the black matrix.

9. The COA liquid crystal panel as claimed in claim 8, wherein the first pixel electrode layer, the second pixel electrode layer, and the common electrode layer are formed of a material of indium tin oxide.

10. The COA liquid crystal panel as claimed in claim 6, wherein the source/drain terminals, the gate terminal, the scan line, and the signal line are made of metallic materials of iron, molybdenum, or copper.

11. A color filter on array (COA) liquid crystal panel, comprising an array substrate, a glass substrate arranged opposite to the array substrate, and a liquid crystal layer arranged between the array substrate and the glass substrate;
wherein the array substrate comprises red, green, blue sub pixel zones, each of the sub pixel zones comprising a base plate, a gate terminal and a scan line arranged on the base plate, a gate insulation layer arranged on the gate terminal and covering the base plate, a semiconductor layer arranged on the gate insulation layer and corresponding to the gate terminal, source/drain terminals arranged on the gate insulation layer and respectively in connection with two ends of the semiconductor layer, a signal line arranged on the gate insulation layer and perpendicularly intersecting the scan line in a horizontal direction, a passivation layer arranged on the source/drain terminals and covering the gate insulation layer, a color resist layer arranged on the passivation layer, a first pixel electrode layer arranged on the color resist layer, a planarization layer arranged on the first pixel electrode layer, and a second pixel electrode layer arranged on the planarization layer;
the color resist layer and the passivation layer comprise a first via formed therein to correspond to and be located above the source/drain terminals, the planarization layer comprising a second via formed therein, the first pixel electrode layer being in engagement with the source/drain terminals through the first via, the second pixel electrode layer being in engagement with the first pixel electrode layer through the second via; and
the color resist layer comprises red, green, blue color resist blocks formed to respectively correspond to the red, green, blue sub pixel zones, two of the color resist blocks that are arranged adjacent to each other in a lateral direction forming a first intersection zone therebetween, the first intersection zone being located above the signal line, two of the color resist blocks that are arranged adjacent to each other in a longitudinal direction forming a second intersection zone therebetween, the second intersection zone being located above the scan line, the second pixel electrode layer comprising a pixel electrode block located in each of the sub pixel zones, the pixel electrode block having a lateral border located above the scan line and a longitudinal border located above the signal line;
wherein the planarization layer is formed of a transparent organic material; and
wherein the source/drain terminals, the gate terminal, the scan line, and the signal line are made of metallic materials of iron, molybdenum, or copper.

12. The COA liquid crystal panel as claimed in claim 11, wherein the glass substrate comprises a dot-like black matrix formed thereon at a location corresponding to the semiconductor layer and a common electrode layer is formed on the black matrix.

13. The COA liquid crystal panel as claimed in claim 12, wherein the first pixel electrode layer, the second pixel electrode layer, and the common electrode layer are formed of a material of indium tin oxide.

* * * * *